United States Patent
Mora et al.

(10) Patent No.: US 7,673,175 B2
(45) Date of Patent: Mar. 2, 2010

(54) COMPUTER CONFIGURATION TRACKING SYSTEM ABLE TO RESTORE A PREVIOUS CONFIGURATION

(75) Inventors: Frederic Mora, Monroe, CT (US); Rajesh Pericherla, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 11/513,856

(22) Filed: Aug. 31, 2006

(65) Prior Publication Data

US 2008/0126302 A1    May 29, 2008

(51) Int. Cl.
G06F 11/00    (2006.01)
(52) U.S. Cl. .......................................... 714/15; 714/20
(58) Field of Classification Search ................... 714/15, 714/16, 20, 38, 39, 47
See application file for complete search history.

(56) References Cited

U.S. PATENT DOCUMENTS

| | | | | |
|---|---|---|---|---|
| 5,745,669 | A  * | 4/1998 | Hugard et al. ................... | 714/3 |
| 6,496,875 | B2 * | 12/2002 | Cheng et al. .................... | 710/1 |
| 6,560,719 | B1 * | 5/2003 | Pham et al. ..................... | 714/15 |
| 6,763,403 | B2 * | 7/2004 | Cheng et al. .................... | 710/36 |
| 6,826,715 | B1 * | 11/2004 | Meyer et al. .................... | 714/37 |
| 6,880,107 | B1 * | 4/2005 | Kraft, IV ....................... | 714/36 |
| 2003/0172130 | A1 * | 9/2003 | Fruchtman et al. ........... | 709/219 |
| 2004/0001431 | A1 * | 1/2004 | Rostron ........................ | 370/216 |
| 2004/0230787 | A1 | 11/2004 | Blumenau et al. | |

FOREIGN PATENT DOCUMENTS

| | | |
|---|---|---|
| EP | 0 952 521 B1 | 4/1999 |
| EP | 1 173 809 B1 | 4/2000 |
| EP | 1 061 431 A2 | 5/2000 |
| EP | 1 250 647 B1 | 12/2000 |
| WO | WO 01/77794 | 4/2001 |

* cited by examiner

*Primary Examiner*—Dieu-Minh Le
(74) *Attorney, Agent, or Firm*—Scully, Scott, Murphy & Presser, P.C.; Kenneth R. Corsello, Esq.

(57) ABSTRACT

A system and method for tracking and restoring computer configuration are disclosed. In one aspect, the system and method monitors for a series of changes in watched one or more computer configuration variables. The changes are registered into a series of saved states. The one or more computer configuration variables may be restored to a desired saved state using the registry of saved states. In one aspect, the system and method monitors the changes by intercepting system calls, determining which system calls affect the one or more computer configuration variables, and logging the system calls and the results of the system calls that affect the one or more computer configuration variables. A recovery script may be dynamically generated to restore to a saved state.

20 Claims, 2 Drawing Sheets

COMPUTER CONFIGURATION TRACKING SYSTEM ABLE TO RESTORE A PREVIOUS CONFIGURATION

FIELD OF THE INVENTION

The present disclosure generally relates to computer processing and particularly to computer configuration tracking system able to restore a previous configuration

BACKGROUND OF THE INVENTION

A computer system comprises a large number of independent variables. A variable can represent an arbitrary data structure. It can be as simple as memory location content, or as complex as the representation of a device. Variables are identified by a name, which is a label containing a reference. This label allows both human users and program to identify the variable and locate its value in the system. The value of a variable is dictated by the content of the data structure it represents. It can be as simple as a single boolean or can be a long series of bytes. The name-value pair that identifies a variable at any given time t is noted (N(t), V(t)). Variables are said to be independent if they cannot be algorithmically derived from other variables.

A user or program performing some work on the computer system is constantly changing a large number of variables. Among these variables, a small subset of independent variables, called the variable working set (VWS), is of particular interest because it is sufficient to describe the state of the system at a certain point in time for the user's purpose. For example, if a user is working on the storage subsystem, his variable working set could be the set of currently available storage devices, their access modes and their mount points. This information would be sufficient for the user to recreate the configuration of the storage subsystem in which he is interested. Variables can be added to or removed from the working set, and the value of variables can change. At any given point in time, the variable working set S(t) is composed of a set of k pairs of variable names and values $S(t)=\{(N1(t), V1(t)), (N2(t), V2(t)), \ldots, (Nk(t), Vk(t))\}$.

This set of variables can be extracted from the current state of the running system and stored. This extraction can either be automatic or performed through well-chosen system commands. It can happen either by examining the current state, or by examining the commands that change this state. The operation that obtains the value of a variable is said to be the "getter" of the variable. Conversely, the operation that allocates a new value to the variable is said to be the "setter" of the variable. The state of the system is affected by its initial configuration, generally stored as files in non-volatile memory or disks. The system, when it initializes, reads the set C of initial configuration files and brings up the computer to a certain initial state S(0). After initialization, a set P of setter programs can be run automatically to bring the system back to the desired state S. A system state S is said to be automatically reachable if there exist a set C of configuration files and a set P of programs such that state S can be attained by the system by initializing on configuration set C and then running program set P.

A user can easily bring the system to an undesirable state, either by mistake or because of a program error. The user will then want to bring the system back to a known-good state, either by issuing command to change variables, or by reinitializing the system. This recovery process is error-prone and tedious if done manually. Unless he is very careful, the user will have to spend a lot of time to recreate the known-good state from which he can resume useful work.

A popular existing solution for this problem is to run virtualized system, also referred to as virtual machines. Virtualizers such as EMC Corporation's VMW allow the user to take "snapshots" of the system status by storing in a large file the current content of the virtual machine's memory, and then restore the whole system state by reloading the snapshot. However, only a few limited hardware architectures can benefit from this system. In addition, snapshots take considerable amount of time and storage for execution. Virtualizers have well-known benefits as well as performance trade-offs that may not be acceptable in some environments. Virtual machines are therefore not always desirable or achievable. Accordingly, a simpler, faster way to restore a configuration—for instance, when only a limited set of state variables are to be restored—is desirable.

Another popular solution is to have system administrators create ad-hoc startup scripts to bring the system into the desirable state. However, this is a manual, error-prone, time-consuming approach. Accordingly, it is also desirable to have systematic, automatable method to recreate a given state on a machine.

BRIEF SUMMARY OF THE INVENTION

A method and system for tracking and restoring computer configuration are provided. In one aspect, the method may comprise determining one or more computer configuration variables to watch and monitoring a computer system for a series of changes in the one or more computer configuration variables. The method also includes logging the series of changes as a series of saved states and determining a recovery state to which to restore a computer variable set or VWS (variable working set). The method further includes retrieving a restore value associated with the computer configuration variable corresponding to the recovery state and executing one or more commands that change the computer configuration variable using the restore value.

In another aspect, the step of monitoring may include intercepting a system call and determining if the system call affects the one or more computer configuration variables. If the system call affects the one or more computer configuration variables, the method may further include issuing the system call and registering the system call. If the system call does not affect the one or more computer configuration variables, the method may include passing the system call to an operating system to handle.

A system for tracking and restoring computer configuration in one aspect may comprise a means for determining one or more computer configuration variables to watch and a monitor driver operable to monitor one or more changes to the one or more computer configuration variables. The monitor driver may be further operable to log the one or more changes. The system may further include a means for receiving a selected recovery state and a means for dynamically generating instructions for restoring the one or more computer configuration variables to the selected recovery state using the logged one or more changes.

In another aspect, the system may further include a definition compiler operable to convert human readable definitions for the one or more computer configuration variables into machine readable form. The human readable definitions may, for example, include definitions specified in XML format. The machine readable form may, for example, include binary code. Yet in another aspect, the means for dynamically generating instructions dynamically generates one or more scripts that can be run to restore the one or more computer configuration variables to the selected recovery state. Still yet in another aspect, the monitor driver may be operable to intercept a plurality of system calls to an operating system to determine if the system calls affect the one or more computer configuration variables.

Further features as well as the structure and operation of various embodiments are described in detail below with reference to the accompanying drawings. In the drawings, like reference numbers indicate identical or functionally similar elements.

DETAILED DESCRIPTION

Figure 1:
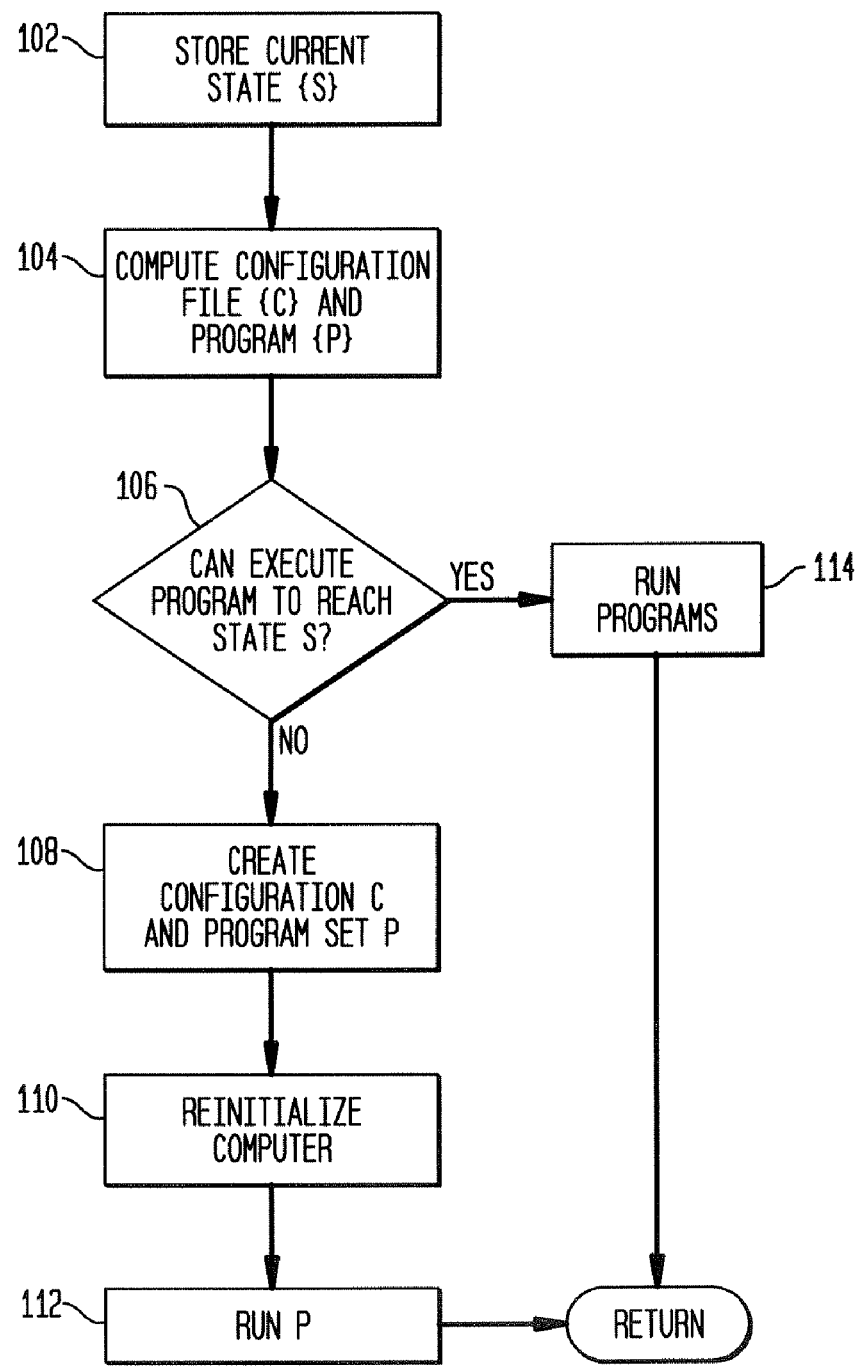
FIG. 1 is a flow diagram illustrating a method of tracking computer configuration in one embodiment of the present disclosure.

A computer configuration tracking system, herein referred to as State Tracking System or STS, of present disclosure in an exemplary embodiment comprises one or more programs that monitor one or more user-defined variable working sets and determine how the current state could be restored at any time at the request of the user. FIG. 1 is a flow diagram illustrating a method of tracking computer configuration in one embodiment of the present disclosure. The STS in one embodiment stores the current state as a set S of (name, value) pairs at 102 and at 104 computes the necessary configuration file set C and/or program set P that are required to restore the system to state S. The subsystem does not necessarily generate the configuration files C and the programs P. Rather, it stores enough information so that C and P can be generated at the user's request.

When the user wants to restore a state S, the STS determines whether or not it can simply execute a set of programs, for example, program set P, to reach that state at 106. If not, it instructs the user that the computer needs to be reinitialized with a configuration C. If the user accepts, the STS at 108 creates the configuration C and/or the program set P. The STS reinitializes the system at 110 then runs P at 112. If at 106, a set of programs can be run to reach the desired state, the STS runs the set of programs at 114.

In an example scenario, an administrator performs changes during the normal operation of a production system. For example he may modify a storage configuration. Such change may typically require two phases: a runtime change that changes the running system configuration; and a configuration change that changes the initialization scripts so that the new configuration will be made permanent and will be restored every time the system restarts.

Using the STS of the present disclosure in one embodiment, the administrator can watch the modified variables, that is, the variables associated with storage in this example. The runtime change is observed by the STS of the present disclosure in one embodiment as VWS change. The STS then registers the change and creates a script that can be executed at startup to put the system in the saved state. The administrator does not need to manually change his startup scripts. The administrator or the like may simply set the system to run the scripts generated by the STS. This way, the STS in one embodiment provides both repeatability of changes and a form of change control, that is, all changes to an observed VWS are automatically registered in one embodiment of the present disclosure. The conventional methods manually examine the system log and infer changes to the configuration from its content when a system is audited.

Another example scenario is illustrated in conjunction with an administrator of a system bringing up a new complex business application. This application, for example, may depend on programs being installed and configured, I/O configuration (e.g., mount points), and subsystems such as database, communications, connectors being brought up with the right configuration. Each of these steps affects the variable working set that is watched by the STS. Only when all these prerequisite steps have been completed can the business application be started. The administrator performs all these steps in turn, manually. On every prerequisite step, the STS watches the changes performed and builds a table of successive states. In an exemplary embodiment, only the commands that are affecting the watched variables are registered. For instance, if the STS is watching mount points, then a "mount" command will be registered, while a simple file listing will not.

If the administrator makes a mistake at one of the steps, or if the system becomes unstable or unresponsive due to a bug in a program, all the preceding steps can be retrieved from the saved change table and automatically performed again. The administrator can query the STS, which puts the machine back into the previously saved state, possibly with a reinitialization if necessary.

Figure 2:
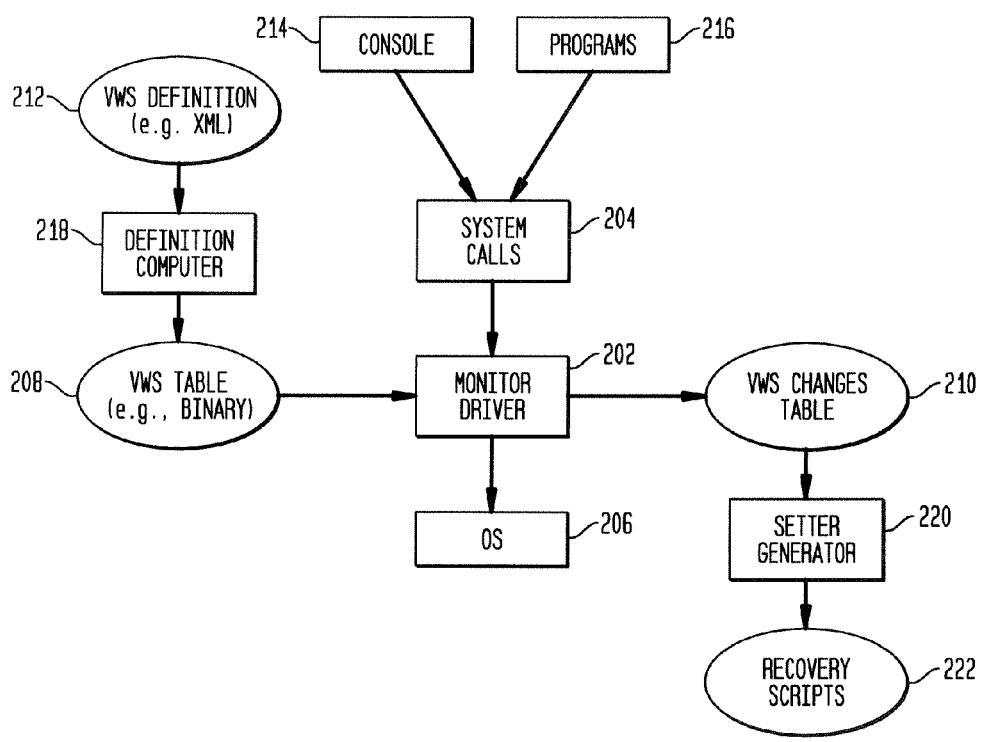
FIG. 2 is a block diagram illustrating a state tracking system in one embodiment of the present disclosure.

FIG. 2 is a block diagram illustrating the STS in one embodiment of the present disclosure. System calls may affect the VWS of interest. System calls 204 may include calls to a kernel or driver routines. They may be invoked by commands issued at the computer's console 214 or by programs 216. In one embodiment, the STS includes a monitor driver 202 that intercepts all system calls 204. The driver 202 in one embodiment is installed at the operating system 206 and filters all system calls. For each incoming system call, the monitor 202 checks the current VWS to see if the system call would modify one of the watched variables. The VWS may be stored anywhere on the system, for example, in memory or in a database. The VWS to watch may be specified in any human-readable language and optionally translated into machine-readable form. If it is determined that the system call modifies one or more of the watched variables, the system call is issued and if it is successful, the monitor 202 registers it as a change in its saved change table 210 where successive states are saved. If the system call is determined as not affecting one or more watched variables, the system call is forwarded to the OS 206.

In one embodiment, checking the VWS can occur asynchronously in a separate execution thread while the OS performs the system call, for instance, to improve performance. To perform this check, the monitor 202 refers to a table containing its current VWS 208, each variable of which can be associated with a set of system calls, and optionally with system call parameters that affect it.

In one embodiment, the VWS is defined in an XML VWS definition file 212. This file is submitted to a definition compiler 218, which creates binary VWS tables 208. These tables 208 speed up the processing of the system calls inside the monitor driver 202. When the monitor driver 202 finds that the currently processed system call is among those that modify the VWS, it records the VWS update. When the STS user wants to save the current VWS, he or she issues a "save command" that tells the monitor driver 202 to retain the current values of the variables in the VWS. This leads the monitor driver to append a new entry in the VWS change table 210. That new entry contains the saved values of the current VWS. So at any given time, the table lists all the retained values of the VWS variables. One possible representation of the table is to have one column per variable in the VWS and one row per "save command" as shown below.

|       |    | Variable |    |
|-------|----|----|----|
|       | X  | Y  | Z  |
| Value | x1 | y1 | z1 |
|       | x2 | y2 | z2 |
|       | x3 | y3 | z3 |

When the user wants to query the saved states, he can issue a command to the STS to dump the change table into user space for perusing. When the user wishes to restore the VWS to a previously stored value, he can chose one of the rows of the change table and request the STS to reset the variables to the values represented in this row. In one embodiment, the restore operation is performed by a "setter script" 222, a set of setter commands generated on-demand at 220 by the STS, and executed on behalf of the user.

There may be cases when the VWS includes variables that are set and modified by one or more existing (non-STS) programs, which may be controlled by one or more existing (non-STS) configuration files. For example, the networking configurations of many systems are defined by configuration files. If the watched variables are network configuration, then the setters are the networking programs (daemons and server subsystems), and in one embodiment of the present disclosure, the getters can be implemented as getting a copy of the configuration files.

Thus, in this example, the VWS can be defined by enumerating the (non-STS) networking programs affecting the variables and the (non-STS) configuration files controlling these programs. Provided with these two lists, the STS will then put the configuration files under version control. Any known or will-be-known methods or systems may be utilized as a version control tool. For instance, a version control system archives past versions of files and provides means to retrieve any past version. In this example, saving the current VWS comprises archiving the current version of the configuration files using the version control system. When the STS is asked to restore this VWS to a previous state, it retrieves the appropriate version of the configuration files and runs the networking programs with these files as input.

An example of the STS implementation in one embodiment is described below. This example watches the state of a hypothetical subsystem. This subsystem has one variable, so the VWS is made of one variable named Var1. That variable is set to a new value Val by a system call, noted in this example as SC (Val) where Val is a parameter of SC (system call) that can be represented as a 32-bit integer. Many programs can issue calls to SC. A monitor driver watches for system calls to monitor changes in Val. Thus, in this example, Var1's getter is the monitor driver.

A setter in this example is defined as calling the same system call again and passing it the value to which to restore Var1. A syscall command may perform this function. Therefore, the setter is defined as that syscall command with the name of the system call (SC) and the parameter (e.g., a 32-bit integer) as parameters.

In one embodiment, to specify the VWS to watch, an administrator may write to an XML file as shown below. Description between <!--and--> denotes comments.

```
<?xml version="1.0" encoding="UTF-8"?>
<VariableWorkingSet id="myvws">
<!-- define the variable in a working set -->
<Variable name="Var1">
<!-- Define the variable getter -->
<Getter>
<!-In this example, MonitorDriver is defined as a kernel module that
intercepts system calls -->
<MonitorDriver system-call-name="SC">
<Parameter name="Val" type="int32"/>
</MonitorDriver>
</Getter>
<!-In this example, syscall is defined as a command that can execute
system calls -->
<Setter>
<Command name="syscall" system-call-name="SC">
<Parameter name="Val" type="int32"/>
</Setter>
</Variable>
</VariableWorkingSet>
```

In one embodiment of the present disclosure, this XML file is submitted to a "definition compiler" that takes the human-readable XML file and generates the proper system setup. In this case, the setup will be to create a machine-readable binary file suitable for fast lookup, and to feed that binary file to the monitor driver that intercepts system calls. The monitoring begins. The monitor driver saves changes to Var1 in its VWS changes table. The user modifies the system, and changes Var1 accordingly. When the user is satisfied that the system is in a desirable state, he or she issues a command that annotates the current value of the VWS (Var1 in this case) as a desirable value, and gives it a symbolic name ("myvws1", for instance). The user continues modifying the system, for instance, during normal course of computer processing. At a later point in time, he may wish to return the VWS to the previously annotated value myvws1. The XML definition above specifies how to return to that state, for instance, by issuing the command syscall with the name of the system call and the saved value as parameters. The machine generates a script containing the specified setter commands and runs it, returning the monitored VWS to state myvws1.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of tracking and restoring computer configuration, comprising:
   determining one or more computer configuration variables to watch;
   monitoring a computer system for a series of changes in the one or more computer configuration variables;
   logging the series of changes as a series of saved states;
   registering one or more commands that caused the series of changes;
   determining a recovery state to which to restore a computer configuration variable;
   retrieving a restore value associated with the computer configuration variable corresponding to the recovery state; and
   executing one or more commands that change the computer configuration variable using the restore value.

2. The method of claim 1, wherein the step of monitoring includes:
   intercepting a system call;
   determining if the system call affects the one or more computer configuration variables;
   if the system call affects the one or more computer configuration variables,
   issuing the system call; and
   registering the system call;
   if the system call does not affect the one or more computer configuration variables,
   passing the system call to an operating system.

3. The method of claim 1, wherein the step of monitoring includes:
   intercepting a system call;
   allowing an operating system to execute the system call; and
   creating a new thread to check whether the system call affects one or more computer configuration variables.

4. The method of claim 1, wherein the step of logging includes logging a change that occurred at a selected state.

5. The method of claim 4, wherein the selected state is received from a user.

6. The method of claim 1, further including:
   allowing a user to query the logged series of changes as a series of saved states.

7. The method of claim 1, further including:
   allowing a user to select a state from the series of saved states.

8. The method of claim 1, wherein the step of logging includes:
   controlling one or more versions of a configuration file affected by one or more configuration programs.

9. The method of claim 8, wherein the step of determining a recovery state to which to restore a computer configuration variable includes:
   determining a version of the configuration file to restore.

10. The method of claim 9, wherein the step of executing includes:
    executing the one or more configuration programs using the determined version of the configuration file as input to the one or more configuration programs.

11. The method of claim 1, wherein the step of determining one or more computer configuration variables to watch includes:
    receiving an XML definition file having at least information associated with the one or more computer configuration variables to watch.

12. A system for tracking and restoring computer configuration, comprising:
    a processor;
    a means for determining one or more computer configuration variables to watch;
    a monitor driver operable to monitor one or more changes to the one or more computer configuration variables, the monitor driver further operable to log the one or more changes and register one or more commands that caused the one or more changes;
    a means for receiving a selected recovery state; and
    a means for dynamically generating instructions for restoring the one or more computer configuration variables to the selected recovery state using the logged one or more changes and one or more of the registered commands.

13. The system of claim 12, further including:
    a definition compiler operable to convert human readable definitions for the one or more computer configuration variables into machine readable form.

14. The system of claim 13, wherein the human readable definitions include definitions specified in XML format.

15. The system of claim 13, wherein the machine readable form includes binary code.

16. The system of claim 12, wherein the means for dynamically generating instructions dynamically generates one or more scripts that can be run to restore the one or more computer configuration variables to the selected recovery state.

17. The system of claim 12, wherein the monitor driver is operable to intercept a plurality of system calls to an operating system to determine if the system calls affect the one or more computer configuration variables.

18. A program storage device readable by machine, tangibly embodying a program of instructions executable by the machine to perform a method of tracking and restoring computer configuration, comprising:
    determining one or more computer configuration variables to watch;
    monitoring a computer system for a series of changes in the one or more computer configuration variables;
    logging the series of changes as a series of saved states;
    registering one or more commands that caused the series of changes;
    determining a recovery state to which to restore a computer configuration variable;
    retrieving a restore value associated with the computer configuration variable corresponding to the recovery state; and
    executing one or more commands that change the computer configuration variable using the restore value.

19. The program storage device of claim 18, wherein the step of monitoring includes:
    intercepting a system call;
    determining if the system call affects the one or more computer configuration variables;
    if the system call affects the one or more computer configuration variables,
    issuing the system call; and
    registering the system call;
    if the system call does not affect the one or more computer configuration variables, passing the system call to an operating system.

20. The program storage device of claim 18, wherein the step of monitoring includes:
    intercepting a system call;
    allowing an operating system to execute the system call; and
    creating a new thread to check whether the system call affects one or more computer configuration variables.

* * * * *